(12) United States Patent
Watanabe et al.

(10) Patent No.: US 12,085,395 B2
(45) Date of Patent: Sep. 10, 2024

(54) MAP GENERATION DEVICE AND MAP GENERATION SYSTEM

(71) Applicant: Mitsubishi Electric Corporation, Tokyo (JP)

(72) Inventors: Masashi Watanabe, Tokyo (JP); Katsuyuki Kamei, Tokyo (JP); Hiroyuki Fujibayashi, Tokyo (JP); Takeo Sakairi, Tokyo (JP); Ken Shimazaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 907 days.

(21) Appl. No.: 17/042,940

(22) PCT Filed: Jun. 12, 2018

(86) PCT No.: PCT/JP2018/022377
§ 371 (c)(1),
(2) Date: Sep. 29, 2020

(87) PCT Pub. No.: WO2019/239477
PCT Pub. Date: Dec. 19, 2019

(65) Prior Publication Data
US 2021/0033406 A1   Feb. 4, 2021

(51) Int. Cl.
*G01C 21/32* (2006.01)
*G06F 16/29* (2019.01)
*G09B 29/00* (2006.01)

(52) U.S. Cl.
CPC .............. *G01C 21/32* (2013.01); *G06F 16/29* (2019.01); *G09B 29/003* (2013.01)

(58) Field of Classification Search
CPC ........................ G01C 21/32; G01C 21/3822; G01C 21/3848; G06F 16/29; G09B 29/003
See application file for complete search history.

(56) References Cited

U.S. PATENT DOCUMENTS 9,939,813 B2 * 4/2018 Shashua ............. G01C 21/3623
10,215,583 B2 * 2/2019 Ng-Thow-Hing ...........................
G01C 21/3658

(Continued)

FOREIGN PATENT DOCUMENTS

JP    2006-226871 A    8/2006
JP    2011-027594 A    2/2011

(Continued)

OTHER PUBLICATIONS

Machine Translated JP2016156973 (Year: 2016).*

(Continued)

*Primary Examiner* — Anne Marie Antonucci
*Assistant Examiner* — Misa H Nguyen
(74) *Attorney, Agent, or Firm* — XSENSUS LLP

(57) ABSTRACT

A map generation device is configured to determine evaluation value of each of a plurality of evaluation items that serve as indices for evaluation the reliability of the positional information of the planimetric feature. The plurality of evaluation items include any of an error amount when arrangement of composing points of the planimetric feature is approximated, a parallelism between an arrangement direction of composing points of the planimetric feature and a movement trajectory of the measuring vehicle, a distance between a position indicated by the position information of the planimetric feature and a position of the measuring vehicle when the position of the planimetric feature is measured, an absolute value of reflection intensity of a position of the planimetric feature obtained from the measurement information or a difference between a position of the planimetric feature and surrounding reflection intensity of the planimetric feature, and so on.

8 Claims, 9 Drawing Sheets

(56) References Cited

U.S. PATENT DOCUMENTS

2014/0297092 A1    10/2014   Delp
2019/0025071 A1     1/2019   Fukui
2020/0166339 A1*   5/2020   Amano .................... G08G 1/09

FOREIGN PATENT DOCUMENTS

| JP | 2013-186655 A | 9/2013 |
| JP | 2015-064755 A | 4/2015 |
| JP | 2016-156973 A | 9/2016 |
| JP | 2017-062166 A | 3/2017 |
| JP | 2017-181870 A | 10/2017 |

OTHER PUBLICATIONS

International Search Report and Written Opinion mailed on Sep. 4, 2018 for PCT/JP2018/022377 filed on Jun. 12, 2018, 7 pages including English Translation of the International Search Report.
European Office Action issued on Feb. 14, 2022, in corresponding European patent Application No. 18922687.1.
Extended European search report issued on Mar. 5, 2021, in corresponding European patent Application No. 18922687.1, 9 pages.

* cited by examiner

F I G. 1
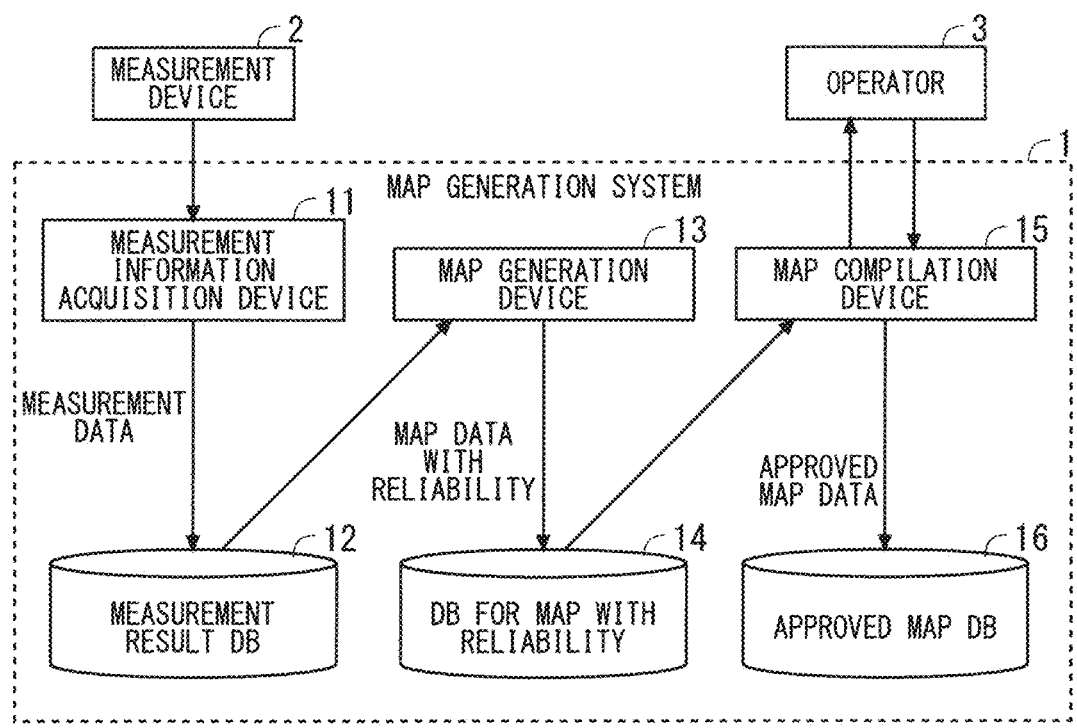

FIG. 15

| PLOTTING DATA NUMBER | EVALUATION ITEM A | EVALUATION ITEM B | EVALUATION ITEM C | CORRECTION |
|---|---|---|---|---|
| 1 | 1.0 | 0.8 | 0.8 | NOT NEEDED |
| 2 | 0.4 | 1.0 | 0.8 | NEEDED |
| 3 | 0.3 | 0.5 | 1.0 | NEEDED |
| 4 | 1.0 | 0.3 | 0.8 | NOT NEEDED |
| 5 | 1.0 | 0.9 | 0.2 | NOT NEEDED |
| 6 | 0.9 | 0.3 | 0.2 | NEEDED |
| 7 | 0.3 | 0.9 | 0.4 | NOT NEEDED |
| 8 | 0.5 | 0.2 | 0.3 | NEEDED |

FIG. 16

| PLOTTING DATA NUMBER | EVALUATION ITEM A | EVALUATION ITEM B | EVALUATION ITEM C | RELIABILITY |
|---|---|---|---|---|
| 11 | 1.0 | 0.9 | 0.8 | 0.9 |
| 12 | 0.3 | 0.8 | 0.7 | 0.4 |
| 13 | 0.9 | 0.8 | 0.4 | 0.8 |
| 14 | 0.9 | 0.3 | 0.3 | 0.3 |
| 15 | 0.8 | 0.3 | 0.8 | 0.7 |

MAP GENERATION DEVICE AND MAP GENERATION SYSTEM

CROSS-REFERENCE TO RELATED APPLICATION

The present application is based on PCT filing PCT/JP2018/022377, filed Jun. 12, 2018, the entire contents of which are incorporated herein by reference.

TECHNICAL FIELD

The present invention relates to a map generation system that generates map information by using measurement information of a space around a road.

BACKGROUND ART

The development of autonomous vehicles is in progress in recent years. In order to realize autonomous traveling, highly accurate map information (map data) is required in addition to sensors such as cameras and laser radars that are installed in vehicles that are being driven autonomously.

As a method of generating highly accurate map information, a method of using three-dimensional information acquired by a technique called Mobile Mapping System (MIMS) has been proposed. MMS is a system that acquires three-dimensional point cloud information, which is three-dimensional spatial position data around a road, by running a measuring vehicle equipped with a Global Positioning System (GPS) antenna, camera, and other measurement devices.

The accuracy of the three-dimensional point cloud information acquired by the measuring vehicle changes depending on the conditions of measurement and processing. In order to efficiently and accurately generate a map, an appropriate and correct evaluation for the reliability (correctness) of the three-dimensional point cloud information is necessary. For example, the following Patent Document 1 proposes a map generation system that evaluates the reliability of the generated map information based on sensor information used when measuring the three-dimensional point cloud information and the weather conditions at the time of measurement.

PRIOR ART DOCUMENTS

Patent Documents

[Patent Document 1] Japanese Patent Application Laid-Open No. 2011-27594

SUMMARY

Problem to be Solved by the Invention

The map generation system of Patent Document 1 evaluates the reliability of the generated map information based on whether the three-dimensional point cloud information is acquired under a fair-weather condition or during day time. However, when inappropriate map information is generated due to various other factors, the reliability thereof cannot be properly evaluated. Further, if the reliability of the map information is not properly evaluated, the manual correction and approval of the map information cannot be performed efficiently.

The present invention has been made to solve the problems as described above, an object is to appropriately evaluate the reliability of the map information generated from the measurement information by the measuring vehicle.

Means to Solve the Problem

According to the present invention, the map generation device includes a planimetric feature position information generation unit configured to generate position information of a planimetric feature based on measurement information around a road obtained by a measuring vehicle, and a planimetric feature position information evaluation unit configured to determine evaluation value of each of a plurality of evaluation items that serve as indices for evaluation the reliability of the positional information of the planimetric feature, based on the measurement information. The plurality of evaluation items include any of an error amount when arrangement of composing points of the planimetric feature is approximated, a parallelism between an arrangement direction of composing points of the planimetric feature and a movement trajectory of the measuring vehicle, a distance between a position indicated by the position information of the planimetric feature and a position of the measuring vehicle when the position of the planimetric feature is measured, an absolute value of reflection intensity of a position of the planimetric feature obtained from the measurement information or a difference between a position of the planimetric feature and surrounding reflection intensity of the planimetric feature, an altitude difference between a position of the planimetric feature the measurement information indicates and a surrounding thereof, or an inclination of an altitude change at a boundary between the planimetric feature and the surrounding thereof, a direction of a surface obtained by surface approximation of composing points of the planimetric feature distributed in a plane, and a correspondence relationship between a height from a road surface at a position indicated by the position information of the planimetric feature and a size of a surface formed by composing points of the planimetric feature.

Effects of the Invention

According to the map generation device of the present invention, the reliability of the planimetric feature included in the map information is determined based on various evaluation items whereby contributing to an appropriate evaluation of the reliability of the map information.

The explicit purpose, feature, phase, and advantage of the present invention will be described in detail hereunder with attached drawings.

BRIEF DESCRIPTION OF DRAWINGS

FIG. 1 A diagram illustrating a configuration of a map generation system according to Embodiment 1 of the present invention.

FIG. 15 A table illustrating an example of data learned by an evaluation function learning unit in Embodiment 3 of the present invention.

FIG. 16 A table illustrating an example of the reliability determined by the reliability determination unit after learning by the evaluation function learning unit in Embodiment 3 of the present invention.

DESCRIPTION OF EMBODIMENTS

Embodiment 1

Figure 2:
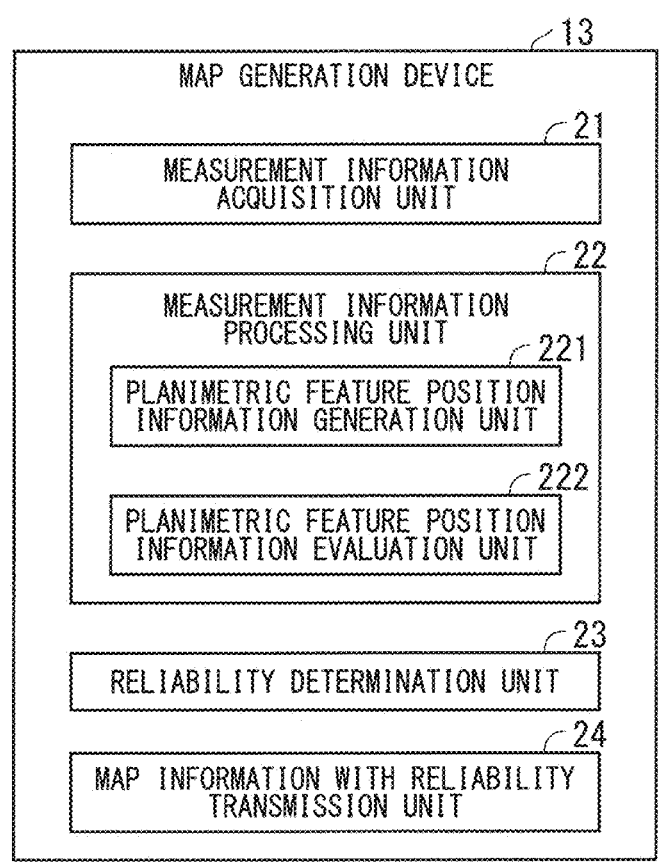
FIG. 2 A diagram illustrating a configuration of a map generation device according to Embodiment 1 of the present invention.

FIG. 1 is a diagram illustrating a configuration of a map generation system 1 according to Embodiment 1 of the present invention. As illustrated in FIG. 1, the map generation system 1 includes a measurement information acquisition device 11, a measurement result database (DB) 12, a map generation device 13, a database for map with reliability 14, a map compilation device 15, and an approved map database 16.

The measurement information acquisition device 11 acquires three-dimensional point cloud information around the road on which the measuring vehicle travels, an image of the periphery of the measuring vehicle, or the like as measurement information from a measurement device 2 mounted on the measurement vehicle of the MMS, for example. The measurement device 2 acquires measurement information by using various sensors such as a GPS antenna, a laser scanner, and a camera equipped in the measuring vehicle. The measurement information acquired by the measurement information acquisition device 11 is stored in the measurement result database 12.

The map generation device 13 generates map information from the measurement information stored in the measurement result database 12. The map generation device 13 acquires measurement information of the map generation target range from the measurement result database 12 and generates map information by automatic processing by software. Here, the map information generated by the map generation device 13 includes position information of planimetric features existing around the road, such as a lane marking line, a road shoulder edge, a sign (road sign, traffic sign), a road marking, a zebra zone, a tunnel boundary, a stop line, a traffic light, a pedestrian crossing, a level crossing, a parking line marking, a rubber pole, a utility pole, and a signboard, and reliability information of position information thereof. Hereinafter, the map information automatically generated by the map generation device 13 will be referred to as "map information with reliability". The map information with reliability generated by the map generation device 13 is stored in the database for map with reliability 14.

The map compilation device 15 is used by an operator 3 to correct and approve map information. The map compilation device 15 acquires the map information with reliability from the database for map with reliability 14, and presents the map information to the operator 3 by displaying the map information on the screen. The operator 3 can check the map information displayed on the screen and operate the map compilation device 15 to correct the displayed map information. Further, the operator 3 can operate the map compilation device 15 to approve the corrected map information or the map information that does not need to be corrected. Hereinafter, the map information approved by the operator 3 using the map compilation device 15 is referred to as "approved map information". The approved map information is stored in the approved map database 16.

The approved map information stored in the approved map database 16 is provided to the user who uses a high precision map.

Next, details of the map generation device 13 will be described. FIG. 2 is a diagram illustrating a configuration of the map generation device 13. As illustrated in FIG. 2, the map generation device 13 includes a measurement information acquisition unit 21, a measurement information processing unit 22, a reliability determination unit 23, and a map information with reliability transmission unit 24.

The measurement information acquisition unit 21 acquires the measurement information stored in the measurement result database 12. The measurement information processing unit 22 generates the map information based on the measurement information acquired by the measurement information acquisition unit 21. In addition, the measurement information processing unit 22 determines the respective evaluation values of a plurality of evaluation items that serve as indices for evaluating the reliability of the positional information of the planimetric feature as a component of the map. The map information generated by the measurement information processing unit 22 includes the evaluation value information of the position information of each planimetric feature. Hereinafter, the map information generated by the measurement information processing unit 22 will be referred to as "map information with evaluation value".

As illustrated in FIG. 2, the measurement information processing unit 22 includes a planimetric feature position information generation unit 221 and a planimetric feature position information evaluation unit 222. When the measurement information processing unit 22 generates the map information, the planimetric feature position information generation unit 221 generates the position information of the planimetric feature, which is a component of the map, based on the measurement information acquired by the measurement information acquisition unit 21. The planimetric feature position information evaluation unit 222 obtains an evaluation value for a plurality of evaluation items, such as a shape and a feature amount of the planimetric feature, from the position information of the planimetric feature generated by the planimetric feature position information generation unit 221, and adds the evaluation value to the position information of the planimetric feature as a component of the map.

The reliability determination unit 23 acquires the map information with the evaluation value generated by the measurement information processing unit 22 and determines the reliability of the position information of each planimetric feature included in the map information. The reliability can be determined using a predetermined evaluation function (for example, a weighted sum of the evaluation values of each evaluation item, or a value determined depending on the range in which the evaluation value of each evaluation item is determined by the if-then rule).

The map information with reliability transmission unit 24 transmits the map information (map information with reliability) in which the reliability determined by the reliability determination unit 23 is added to the position information of each planimetric feature to the database for map with reliability 14.

Here, the planimetric feature position information generation unit 221 and the planimetric feature position information evaluation unit 222 of the measurement information processing unit 22 will be described in detail.

The planimetric feature position information generation unit 221 generates position information of planimetric features such as a lane marking line, a road shoulder edge, a sign, a road marking, a zebra zone, a tunnel boundary, a stop line, a traffic light, a pedestrian crossing, a level crossing, a parking line marking, a rubber pole, a utility pole, and a signboard, which are components of the map.

Figure 3:
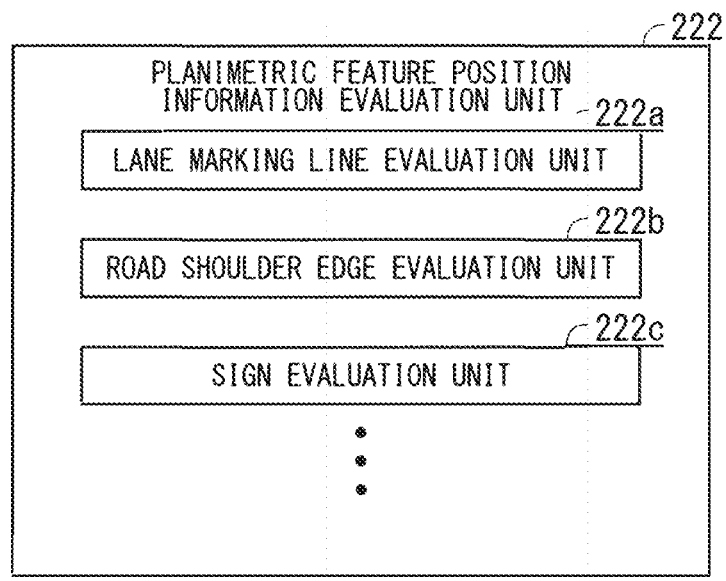
FIG. 3 A diagram illustrating a configuration of a planimetric feature position information evaluation unit according to Embodiment 1 of the present invention.

The planimetric feature position information evaluation unit 222 calculates evaluation values of position information of various planimetric features as described above. To this end, as illustrated in FIG. 3, the planimetric feature position information evaluation unit 222 includes a lane marking line evaluation unit 222a that calculates the evaluation value of the position information of the lane marking line, a road shoulder edge evaluation unit 222b that calculates the evaluation value of the position information of the road shoulder edge, and a sign evaluation unit 222c that calculates the evaluation value of the position information of the sign. Although the planimetric feature position information evaluation unit 222 also evaluates the position information of planimetric features other than lane marking lines, road shoulder edges, and signs, three descriptions are mainly made on the lane marking line evaluation unit 222a, the road shoulder edge evaluation unit 222b, and the sign evaluation unit 222c.

Figure 4:
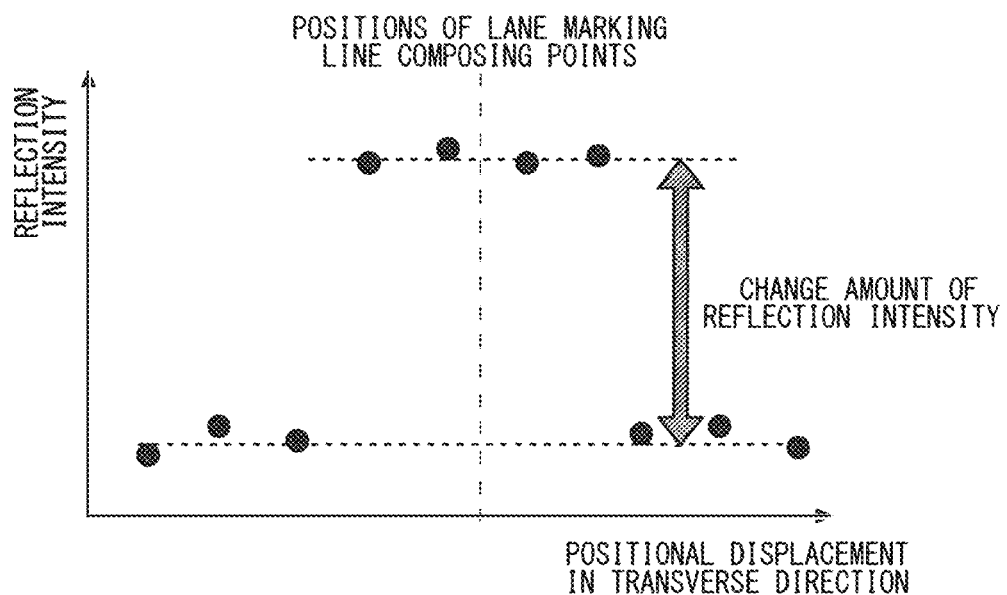
FIG. 4 A graph for explaining an estimation method of the position of a lane marking line.

For example, the planimetric feature position information generation unit 221 acquires three-dimensional point cloud information with reflection intensity information as measurement information, estimates the position of the lane marking line from the location of the change in reflection intensity (brightness) and the continuity of the location of change, and plots the location extracted as a lane marking line as a lane marking line as a component of the map. For example, as illustrated in FIG. 4, from the distribution of the reflection intensity in the transverse direction of the road, a position with high reflection intensity is estimated as the position of the lane marking line, and the center position thereof is extracted as lane marking line composing points.

Figure 5:
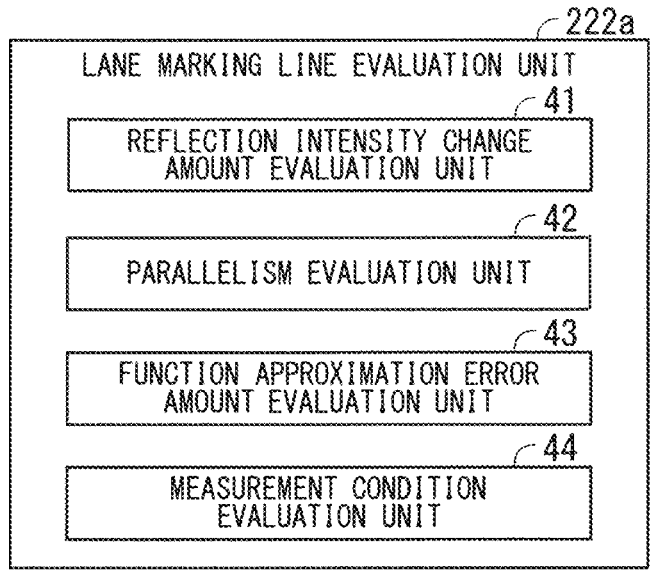
FIG. 5 A diagram illustrating a configuration of a lane marking line evaluation unit according to Embodiment 1 of the present invention.

As illustrated in FIG. 5, the lane marking line evaluation unit 222a for calculating the evaluation value of the position information of the lane marking line includes a reflection intensity change amount evaluation unit 41, a parallelism evaluation unit 42, a function approximation error amount evaluation unit 43, and a measurement condition evaluation unit 44. The lane marking line evaluation unit 222a assigns the evaluation value of each evaluation item obtained by the units to each planimetric feature. In a case where the planimetric feature is a lane marking line, the unit of the planimetric feature may be defined by dividing the lane marking line at each branch point or confluence of the road or be defined by delimiting the lane marking line at a certain distance (for example, every several meters to several hundred meters).

The reflection intensity change amount evaluation unit 41 obtains a reflection intensity change amount (see FIG. 4), which is a difference between the reflection intensity of a portion extracted as a lane marking line and the reflection intensity of its surroundings, and evaluates the magnitude of the reflection intensity change amount. The large reflection intensity change amount means that the position of a clear lane marking line is considered to be acquired; therefore, the reflection intensity change amount evaluation unit 41 raises the evaluation value of the position information of the lane marking line as the reflection intensity change amount increases.

Here, although the evaluation item is the difference between the reflection intensity of the portion extracted as the lane marking line and the surrounding reflection intensity, the absolute value of the reflection intensity of the portion extracted as the lane marking line may be used as the evaluation item.

Figure 6:
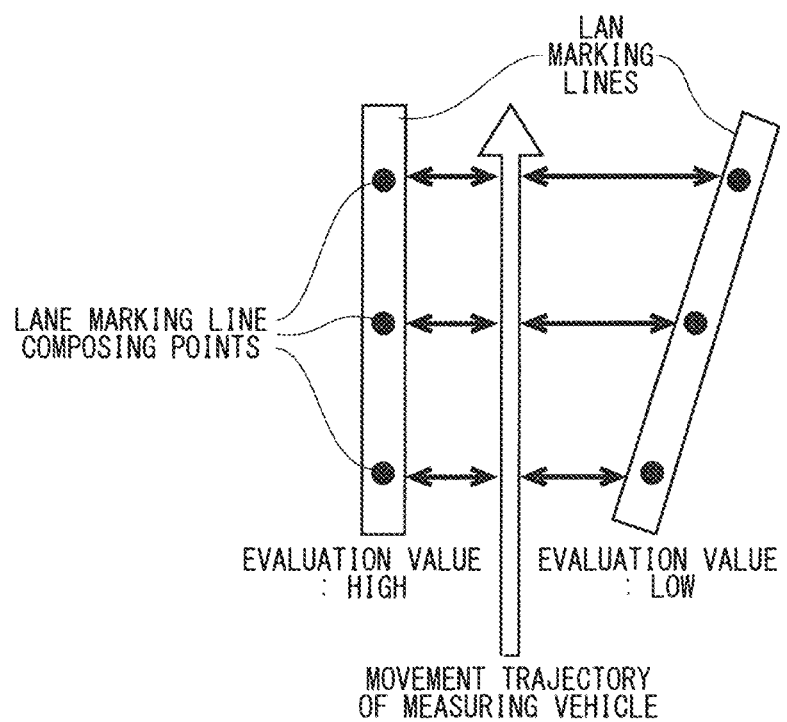
FIG. 6 A diagram for explaining processing of a parallelism evaluation unit.

The parallelism evaluation unit 42 evaluates the parallelism between the arrangement direction of the lane marking line composing points and the movement trajectory of the measuring vehicle. As illustrated in FIG. 6, if the arrangement of lane marking line composing points is not parallel to the moving trajectory of the measuring vehicle, the parallelism evaluation unit 42 lowers the evaluation value of the position information of the lane marking line because of the highly possible false extraction of stop lines or other road markings as the lane marking line.

The function approximation error amount evaluation unit 43 evaluates the value of the error amount sum when arrangement of the lane marking line composing points is approximated by a cubic function by the least square method. The error amount represents the degree of linear rattling; accordingly, the function approximation error amount evaluation unit 43 raises the evaluation value of the position information of the lane marking line as the error amount sum is smaller. The approximation method is not limited to the cubic function approximation.

The measurement condition evaluation unit 44 obtains the evaluation value of the position information of the lane marking line from the distance between the position of the measuring vehicle at the time when the measurement device 2 acquired the measurement information used to estimate the lane marking line and the lane marking line composing points and the weather condition when the measurement device 2 acquired the measurement information used to estimate the lane marking line. For example, if the lane marking line is far from the measuring vehicle, the data density becomes low, and the reliability of the data lowers; therefore, the measurement condition evaluation unit 44 lowers the evaluation value of the position information of the lane marking line as the lane marking line composing points are farther from the measuring vehicle. Further, the reliability of the data acquired by the measurement device 2 lowers in bad weather such as rain; therefore, the measurement condition evaluation unit 44 lowers the evaluation value of the position information of the lane marking line as the weather under which the measurement information is acquired is worse.

It should be noted that, although description of evaluation of position information of a zebra zone, a road marking, a stop line, a pedestrian crossing, a parking line marking, etc. is omitted, evaluation of these planimetric features whose position is estimated from information of reflection intensity can be performed using the same evaluation items as the evaluation items of the lane marking line evaluation unit 222a.

Further, the planimetric feature position information generation unit 221 estimates the position of the road shoulder edge from the location displaced in the height direction and its continuity from the three-dimensional point cloud information as the measurement information, and plots the location extracted as a road shoulder edge as a road shoulder edge as a component of the map. A location having a displacement in the height direction is extracted as a road shoulder edge composing point.

Figure 7:
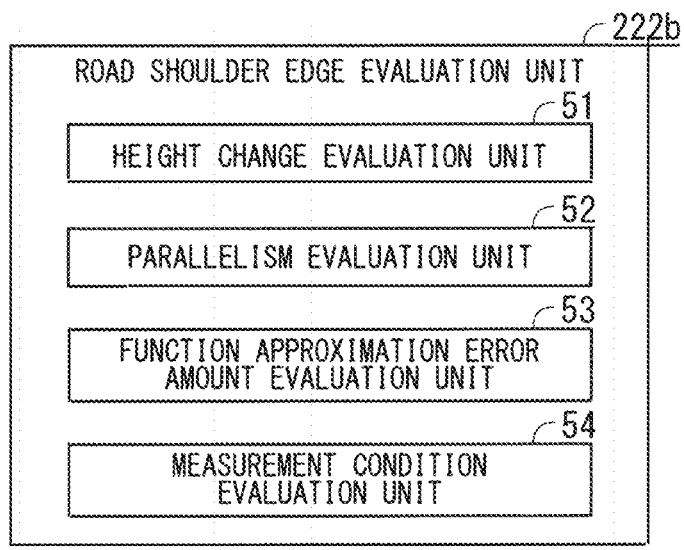
FIG. 7 A diagram illustrating a configuration of a road shoulder edge evaluation unit according to Embodiment 1 of the present invention.

As illustrated in FIG. 7, the road shoulder edge evaluation unit 222b that evaluates the position information of the road shoulder edge includes a height change evaluation unit 51, a parallelism evaluation unit 52, a function approximation error amount evaluation unit 53, and a measurement condition evaluation unit 54. The road shoulder edge evaluation unit 222b assigns the evaluation value of each evaluation item thus obtained by the units to each planimetric feature. In a case where the planimetric feature is a road shoulder edge, the unit of the planimetric feature may also be defined by dividing the road shoulder edge at each branch point or confluence of the road or be defined by delimiting the road shoulder edge at a certain distance (for example, every several meters to several hundred meters).

The height change evaluation unit 51 obtains an altitude difference (step) between the location extracted as the road shoulder edge and its surroundings, and evaluates the degree of the altitude difference. The large altitude difference means that the position of a clear road shoulder edge is considered to be acquired; therefore, the height change evaluation unit 51 raises the evaluation value of the position information of the road shoulder edge as the altitude difference increases.

Here, although the evaluation item is the altitude difference between the portion extracted as the road shoulder edge and its surrounding, for example, the degree of inclination of the altitude change at the boundary between the location extracted as the road shoulder edge and its surroundings, that is, the degree of inclination may be used as the evaluation item.

The parallelism evaluation unit 52, the function approximation error amount evaluation unit 53, and the measurement condition evaluation unit 54 evaluate the position information of the road shoulder edge in the same manner as the parallelism evaluation unit 42, the function approximation error amount evaluation unit 43, and the measurement condition evaluation unit 44 in the lane marking line evaluation unit 222a.

Specifically, the parallelism evaluation unit 52 evaluates the parallelism between the arrangement direction of the road shoulder edge composing points and the movement trajectory of the measuring vehicle. If the arrangement of road shoulder edge composing points is not parallel to the moving trajectory of the measuring vehicle, the parallelism evaluation unit 52 lowers the evaluation value of the position information of the road shoulder edge because of the highly possible false extraction of the unevenness of the road as the road shoulder edge.

The function approximation error amount evaluation unit 53 evaluates the value of the error amount sum when arrangement of road shoulder edge composing points is approximated by a cubic function by the least square method. As this value is smaller, the function approximation error amount evaluation unit 53 raises the evaluation value of the position information of the road shoulder edge.

The measurement condition evaluation unit 54 obtains the evaluation value of the position information of the road shoulder edge from the distance between the position of the measuring vehicle at the time when the measurement device 2 acquired the measurement information used to estimate the road shoulder edge and the road shoulder edge composing points and the weather condition when the measurement device 2 acquired the measurement information used to estimate the road shoulder edge. For example, if the road shoulder edge is far from the measuring vehicle, the data density becomes low, and the reliability of the data lowers; therefore, the measurement condition evaluation unit 54 lowers the evaluation value of the position information of the road shoulder edge as the road shoulder edge composing points are farther from the measuring vehicle. Further, the reliability of the data acquired by the measurement device 2 lowers in bad weather such as rain; therefore, the measurement condition evaluation unit 54 lowers the evaluation value of the position information of the road shoulder edge as the weather under which the measurement information is acquired is worse.

It should be noted that, although description of evaluation of position information of a rubber pole, a level crossing, a utility pole, etc. is omitted, evaluation of these planimetric features whose position is estimated from information of the altitude difference can be performed using the same evaluation items as the evaluation items of the road shoulder edge evaluation unit 222b.

Further, from the three-detention point cloud information with reflection intensity as measurement information, and the image around the measuring vehicle when the measurement information was acquired, the planimetric feature position information generation unit 221 plots the location that exists at a certain height from the road surface and in which the point cloud is distributed in a plane as a sign as a component of the map. A surface obtained by surface approximation of a point cloud distributed in a plane is extracted as the surface for the sign.

Figure 8:
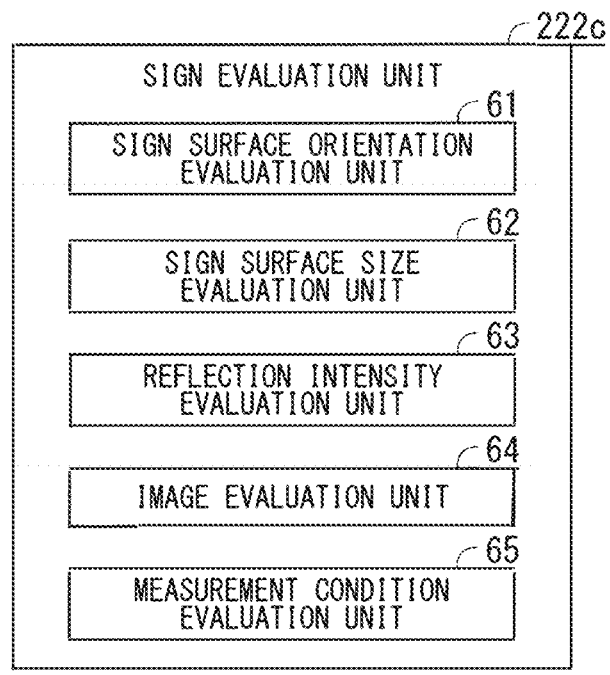
FIG. 8 A diagram illustrating a configuration of a sign evaluation unit according to Embodiment 1 of the present invention.

As illustrated in FIG. 8, the sign evaluation unit 222c that evaluates the position information of the sign includes a sign surface orientation evaluation unit 61, a sign surface size evaluation unit 62, a reflection intensity evaluation unit 63, an image evaluation unit 64, and a measurement condition evaluation unit 65. The sign evaluation unit 222c assigns the evaluation value of each evaluation item thus obtained by the units to each planimetric feature.

The sign surface orientation evaluation unit 61 evaluates the difference between the orientation of the extracted sign surface (the direction of the normal vector) and the direction of the movement trajectory of the measuring vehicle. Normally, the orientation of the sign surface faces the road. The small difference between the orientation of the sign surface and the direction of the movement trajectory of the measuring vehicle means that the sign is considered to face the road; therefore, the sign surface orientation evaluation unit 61 raises the evaluation value of the position information of the sign as the difference decreases.

The sign surface size evaluation unit 62 evaluates the validity of the size of the sign surface from the height at which the extracted sign surface is located (height from the road surface). In general, the type of the sign (guidance sign, regulation sign, etc.) is determined to some extent by the height at which the sign is installed, and the size of the sign can also be assumed. For example, many guidance signs are large, and regulation signs are not so large. Based on this, the reliability of the position information of the sign can be evaluated from the validity of the correspondence relationship between the size of the extracted sign surface and the height at which the sign surface is located. Therefore, the sign surface size evaluation unit 62 obtains a possible range in which the size of the extracted sign surface can possibly be taken. from the height at which the extracted sign surface is located and the installation regulations of the sign, and evaluates whether or not the area of the extracted sign surface is included in the possible range. When the area of the sign surface is included in the possible range, the sign surface size evaluation unit 62 raises the evaluation value of the position information of the sign.

The reflection intensity evaluation unit 63 obtains the median of the reflection intensity of the point cloud included in the extracted sign surface and evaluates the value thereof. Normally, the signs are drawn in a bright color so that a driver can visually recognize with ease. Therefore, when the reflection intensity of the sign surface is high, the reflection intensity evaluation unit 63 raises the evaluation value of the position information of the sign. On the contrary, when the reflection intensity is low, the reflection intensity evaluation unit 63 lowers the evaluation value because of the highly possible false extraction of an object such as a bridge pier as a sign.

The image evaluation unit 64 analyzes the image in which the position of the extracted position sign surface is photographed and evaluates whether or not a sign-like object is shown in the image. When a sign-like object is shown in the image, the image evaluation unit 64 raises the evaluation value of the position information of the sign. The determination as to whether or not the object shown in the image is a sign can be made by machine learning for sign images.

The measurement condition evaluation unit 65 evaluates the position information of the sign by the same method as the measurement condition evaluation unit 44 in the lane marking line evaluation unit 222a.

Specifically, The measurement condition evaluation unit 65 obtains the evaluation value of the position information of the sign from the distance between the position of the measuring vehicle at the time when the measurement device 2 acquired the measurement information used to estimate the position of the sign and the sign composing points and the weather condition when the measurement device 2 acquired the measurement information used to estimate the position of the sign. For example, if the estimated position of the sign is far from the measuring vehicle, the data density is lowered, decreasing the reliability of the data; therefore, the measurement condition evaluation unit 65 decreases the evaluation value of the position information of the sign as the estimated position of the sign is farther from the measuring vehicle. Further, the reliability of the data acquired by the measurement device 2 lowers in bad weather such as rain; therefore, the measurement condition evaluation unit 65 lowers the evaluation value of the position information of the sign as the weather under which the measurement information is acquired is worse.

Note that although description of evaluation of position information such as a tunnel boundary, a traffic signal, and a signboard is omitted, evaluation of planimetric features having a planar shape is estimated using the same evaluation items as the evaluation items of the sign evaluation unit 222c.

Figure 9:
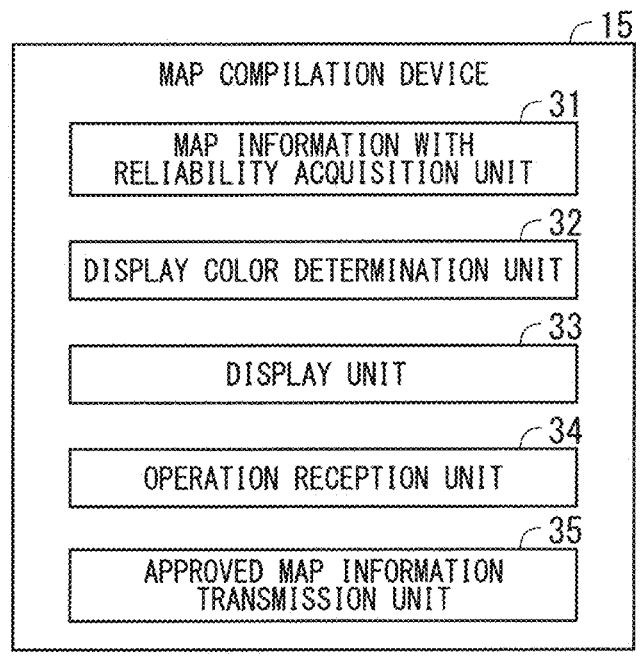
FIG. 9 A diagram illustrating a configuration of a map compilation device according to Embodiment 1 of the present invention.

Next, details of the map compilation device 15 will be described. FIG. 9 is a diagram illustrating a configuration of the map compilation device 15. As illustrated in FIG. 9, the map compilation device 15 includes a map information with reliability acquisition unit 31, a display color determination unit 32, a display unit 33, an operation reception unit 34, and an approved map information transmission unit 35.

The map information with reliability acquisition unit 31 acquires map information with reliability from the database for map with reliability 14. The display unit 33 presents the map corresponding to the map information with reliability acquired by the database for map with reliability 14 to the operator 3 by displaying the map on the screen.

The display color determination unit 32 determines the display color of each planimetric feature when the map is displayed on the display unit 33 according to the reliability of each planimetric feature included in the map information with reliability. As a result, the display unit 33 displays a map in which the degree of reliability of the positional information of each planimetric feature is represented in color. The operator 3 can grasp the reliability of the positional information of the planimetric feature from the color of the planimetric feature in the map displayed on the display unit 33. Therefore, the operator 3 can check, at a glance, which planimetric features have position information with high reliability and low necessity of correction, and which planimetric features have position information with low reliability and high necessity of correction and this allows effective work of correction and approval.

The operation reception unit 34 is a user interface that receives the operation by the operator 3. The operator 3 can correct or approve the map information by operating the operation reception unit 34.

The approved map information transmission unit 35 transmits the map information approved by the worker 3 (approved map information) to the approved map database 16. The approved map information stored in the approved map database 16 is provided to the user who uses a high precision map.

Figure 10:
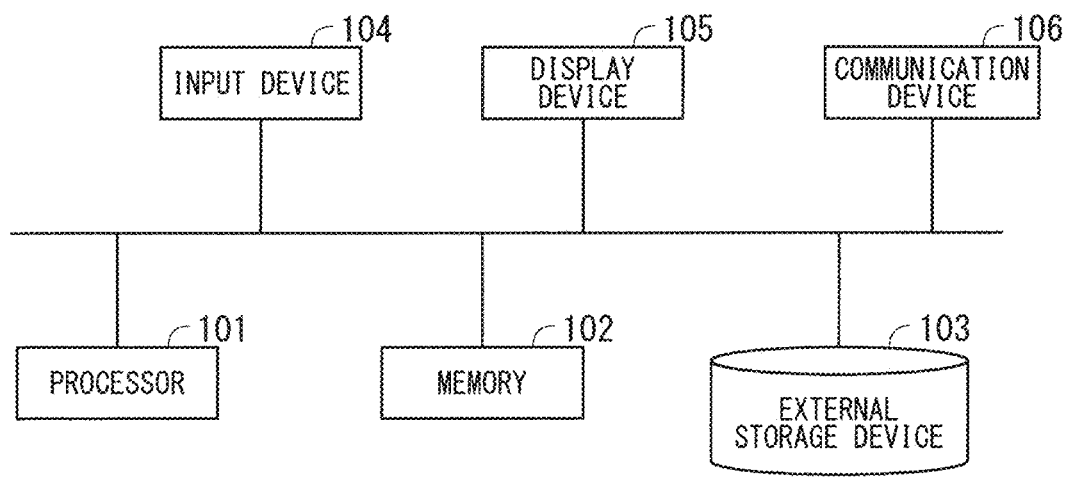
FIG. 10 A diagram illustrating a hardware configuration of a map generation system according to Embodiment 1 of the present invention.

FIG. 10 is a diagram illustrating an example of the hardware configuration of the map generation system 1. The map generation system 1 of FIG. 1 can be configured by a processor 101, a memory 102, an external storage device 103, an input device 104, a display device 105, and a communication device 106.

For example, the measurement information acquisition device 11 can be realized by the communication device 106 capable of communicating with the measurement device 2. The communication device 106 as the measurement information acquisition device 11 may be any communication means as long as the measurement information can be acquired from the measurement device 2. When the communication device 106 acquires the measurement information from the measurement device 2 of the traveling measuring vehicle at any time, the communication between the communication device 106 and the measurement device 2 needs to be wireless communication. However, when the communication device 106 collectively acquires the measurement information accumulated in the measurement device 2 after the measuring vehicle travels, wired communication may be adopted between the communication device 106 and the measurement device 2. Alternatively, the transfer of the measurement information from the measurement device 2 to the measurement information acquisition device 11 may be performed via a portable storage medium such as a memory card, in which case the measurement information acquisition device 11 is configured by a storage medium reading device.

Further, the measurement result database 12, the database for map with reliability 14, and the map compilation device 15 can be realized by the external storage device 103. The measurement result database 12, the database for map with reliability 14, and the external storage device 103 as the map compilation device 15 are preferably rewritable large-capacity storage media such as an HDD and a magnetic disk.

The map generation device 13 can be realized by the processor 101 reading and executing a program stored in the memory 102. That is, the memory 102 stores a program that, when executed by the processor 101, eventually, executes a process of generating the position information of the planimetric feature based on the measurement information around the road obtained by the measuring vehicle, a process of determining the evaluation value of each of a plurality of evaluation items that serve as indices for evaluating the reliability of the positional information of the planimetric feature based on the measurement information, a process of determining the reliability of the position information of the planimetric feature based on the evaluation value, and a process of generating the map information with reliability including reliability information of the position information of the planimetric feature.

The map compilation device 15 can be realized by the processor 101 controlling the input device 104 and the display device 105 by reading and executing the program stored in the memory 102. That is, the memory 102 stores a program that, when executed by the processor 101, eventually, executes a process of causing the input device 104 to function as the operation receiving unit 34, a process of causing the display device 105 to function as the display unit 33, a process of determining the display color of a planimetric feature on the map displayed on the display device 105 as the display unit 33 based on the reliability of the planimetric feature, and a process of correcting and approving the map information based on an operation input to the input device 104 as the operation reception unit 34.

Here, although the map generation device 13 and the map compilation device 15 are described as being realized by the same processor 101 and memory 102, respective devices may be realized by different processors and memories. Similarly, the measurement result database 12, the database for map with reliability 14, and the approved map database 16 may be realized by different storage devices.

The processor 101 is also called a central processing unit (CPU), a processing device, a computing device, a microprocessor, a microcomputer, and a Digital Signal Processor (DSP).

Here, for the memory 102, for example, a non-volatile or volatile semiconductor memory, such as a random access memory (RAM), a read only memory (ROM), a flash memory, an erasable programmable read only memory (EPROM), an electrically erasable programmable read only memory (EEPROM), or the like, a hard disk drive (HDD), a magnetic disk, a flexible disk, an optical disk, a compact disk, a mini disk, a digital versatile disc (DVD) and a drive device therefor may be considered.

The input device 104 may be a hardware key such as a keyboard or a mouse, or may be a software key displayed on the screen. As the display device 105, for example, a liquid crystal display device or the like can be used. For example, a software key as the input device 104 may be displayed on the display device 105, in which case the input device 104 and the display device 105 can be configured as one touch panel.

Embodiment 2

Figure 11:
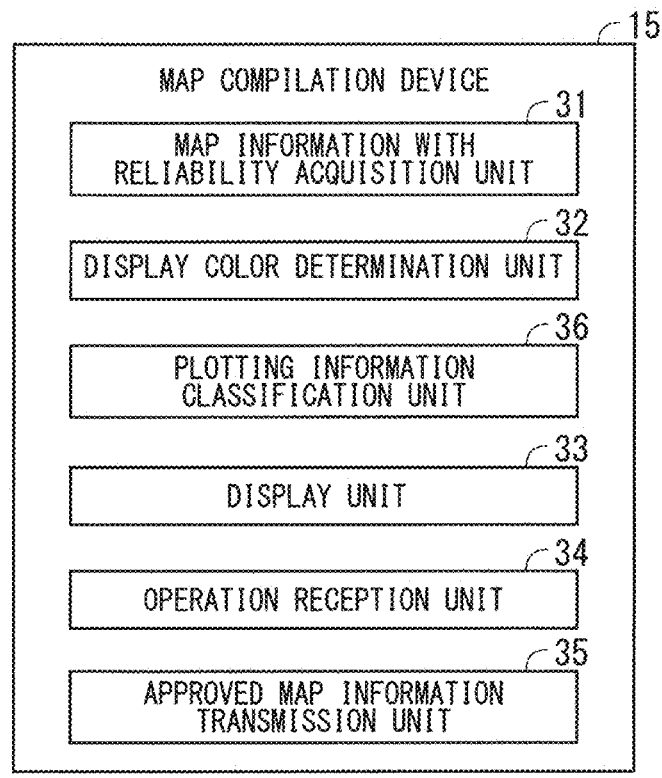
FIG. 11 A diagram illustrating a configuration of a map compilation device according to Embodiment 2 of the present invention.

FIG. 11 is a diagram illustrating a configuration of a map compilation device 15 according to Embodiment 2. The configuration of the map compilation device 15 of Embodiment 2 is such that a plotting information classification unit 36 is added to the map compilation device 15 (FIG. 9) of Embodiment 1. The configuration of Embodiment 2 is the same as Embodiment 1 other than the map compilation device 15.

The plotting information classification unit 36 obtains information on the reliability of the position information of the plotted planimetric features and the evaluation value of each evaluation item, and classifies the planimetric features having position information with low reliability into groups by the causes for the low reliability. That is, the plotting information classification unit 36 classifies the planimetric features included in the map information with reliability depending on which evaluation value of the plurality of evaluation items being low among the plurality of evaluation items.

As an example of classification, an example is shown in which the plotting information classification unit 36 classifies the lane marking lines into groups. First, the plotting information classification unit 36 extracts, from the map information, lane marking lines whose positional information reliability is equal to or lower than a certain level. Then, the plotting information classification unit 36 classifies the extracted lane marking lines into, for example, a first group for lane marking lines having an evaluation value of the error amount of the function approximation is a certain value or less, a second group for lane marking lines that do not fall into the first group and have an evaluation value of parallelism with respect to the movement trajectory of the measuring vehicle that is a certain value or less, a third group for lane marking lines that do not fall into the first and second groups and have an evaluation value of the change in reflection intensity that is a certain value or less, and a fourth group for lane marking lines that do not fall into the first, second, and third groups and have an evaluation value of the measurement condition that is a certain value or less.

Figure 12:
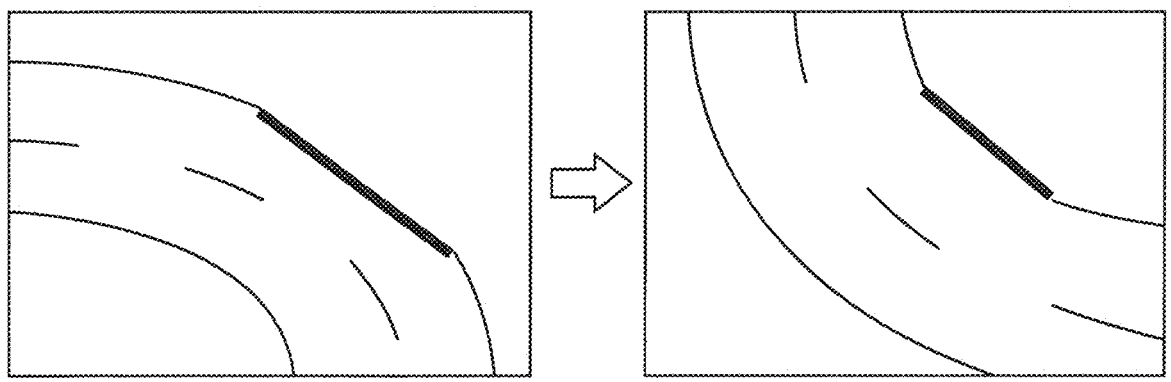
FIG. 12 A diagram illustrating an example of screen transition of a display unit according to Embodiment 2 of the present invention.
Figure 13:
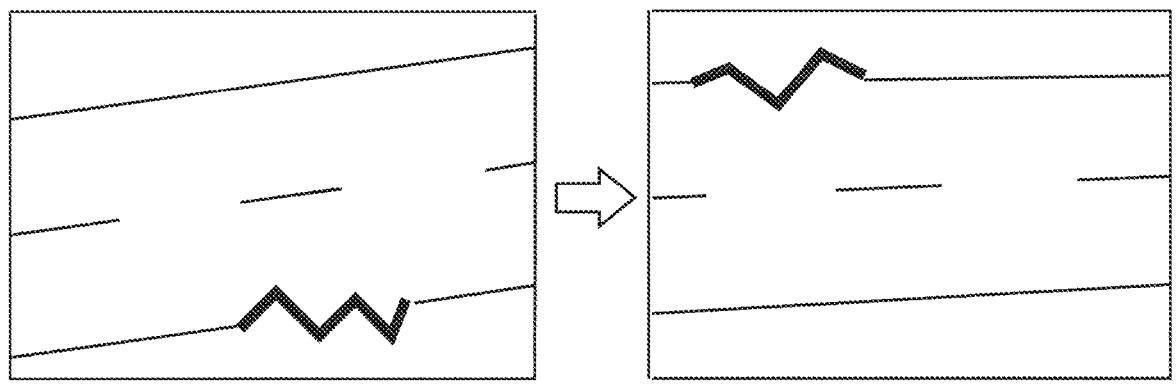
FIG. 13 A diagram illustrating an example of screen transition of the display unit according to Embodiment 2 of the present invention.

When displaying the map corresponding to the map information with reliability on the display unit 33, the map compilation device 15 can switch the screen display so that the planimetric features belonging to the same group are displayed successively. FIGS. 12 and 13 illustrate transition examples of screens when the planimetric features belonging to the same group are displayed successively on the display unit 33. As illustrated in FIGS. 12 and 13, the operator 3 can switch the screen display of the display unit 33 so that the planimetric features (lane marking lines represented by bold lines) whose position information reliability is low due to the common cause are displayed successively on the screen of the display unit 33 by operating the operation reception unit 34.

The operator 3 can successively check and correct the planimetric features whose reliability of the position information has become low with the common cause. The correction work of the planimetric features whose reliability of position information has become low with the common cause involves similar breakdowns in many cases; therefore, the correction work of the map information is facilitated by successively performing those corrections.

Embodiment 3

Figure 14:
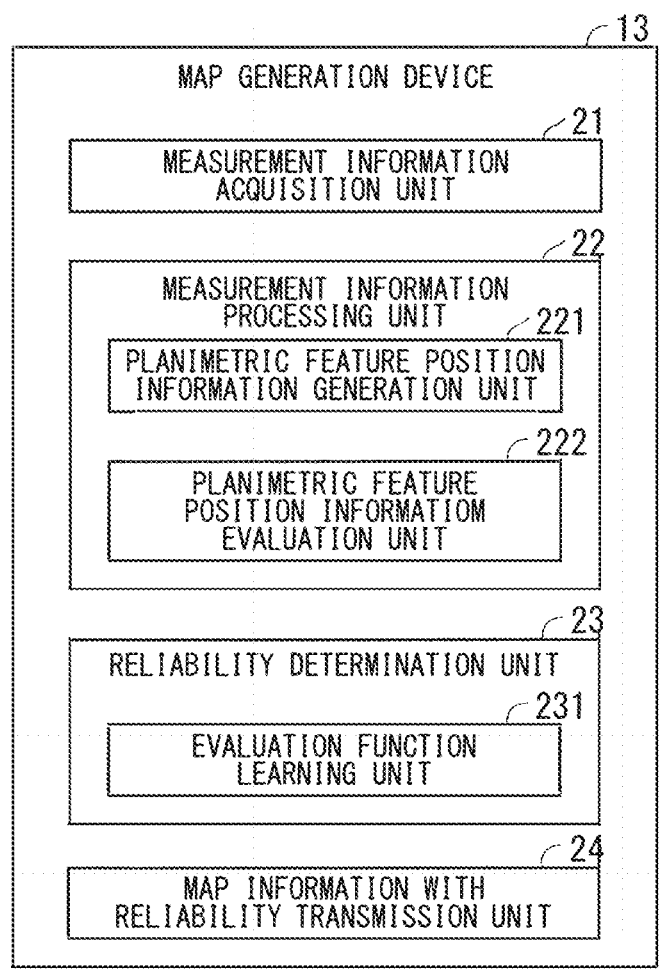
FIG. 14 A diagram illustrating a configuration of a map generation device according to Embodiment 3 of the present invention.

FIG. 14 is a diagram illustrating a configuration of a map compilation device 13 according to Embodiment 3. The configuration of the map generation device 13 of Embodiment 3 is such that an evaluation function learning unit 231 is added to the reliability determination unit 23 in the map generation device 13 (FIG. 2) of Embodiment 1. The configuration of Embodiment 3 is the same as Embodiment 1 or 2 other than the map generation device 13.

The evaluation function learning unit 231 learns the correlation between the evaluation values of a plurality of evaluation items regarding the position information of the planimetric feature and whether or not the planimetric feature needs correction by the map compilation device 15. Then, the evaluation function learning unit 231 corrects the evaluation function for calculating the reliability so that the reliability of the position information of planimetric features that have evaluation values similar to that of previously corrected planimetric features is lowered and the reliability of the position information of planimetric features that have evaluation values similar to that of previously non-corrected planimetric features is raised. As a result, the necessity of correction is added to the reliability of the position information of the planimetric feature. As a result, the operator 3 can appropriately determine whether or not the correction is needed from the degree of reliability.

FIG. 15 is an example of data used by the evaluation function learning unit 231 for learning. In the example of FIG. 15, on planimetric features with low evaluation value in an evaluation item A (plotting data numbers 2 and 3) or planimetric features with low evaluation value in evaluation item values B and C (plotting data numbers 6 and 8), there is a tendency that the correction is readily performed by the map compilation device 15. When the evaluation function learning unit 231 has learned such tendency, as illustrated in FIG. 16, the reliability determination unit 23 becomes to determine that the reliability of planimetric features having low evaluation values in evaluation item A (plotting data number 12) and planimetric features having low evaluation values in both evaluation item B and C is low.

It should be noted that Embodiments of the present invention can be arbitrarily combined and can be appropriately modified or omitted without departing from the scope of the invention.

While the invention has been described in detail, the forgoing description is in all aspects illustrative and not restrictive. It is understood that numerous other modifications and variations can be devised without departing from the scope of the invention.

EXPLANATION OF REFERENCE SIGNS 1 map generation system, 2 measurement device, 3 operator, 11 measurement information acquisition device, 12 measurement result database, 13 map generation device, 14 database for map with reliability, 15 map compilation device, 16 approved map database, 21 measurement information acquisition unit, 22 measurement information processing unit, 221 planimetric feature position information generation unit, 222 planimetric feature position information evaluation unit, 23 reliability determination unit, 231 evaluation function learning unit, 23 map information with reliability transmission unit, 31 map information with reliability acquisition unit, 32 display color determination unit, 33 display unit, 34 operation reception unit, 35 approved map information transmission unit, 36 plotting information classification unit, 222a lane marking line evaluation unit, 41 reflection intensity change amount evaluation unit, 42 parallelism evaluation unit, 43 function approximation error amount evaluation unit, 44 measurement condition evaluation unit, 222b road shoulder edge evaluation unit, 51 height change evaluation unit, 52 parallelism evaluation unit, 53 function approximation error amount evaluation unit, 54 measurement condition evaluation unit, 222c sign evaluation unit, 61 sign surface orientation evaluation unit, 62 sign surface size evaluation unit, 63 reflection intensity evaluation unit, 64 image evaluation unit, 65 measurement condition evaluation unit, 101 processor, 102 memory, 103 external storage device, 104 input device, 105 display device, 106 communication device.

The invention claimed is:

1. A map generation system comprising:
a map generation device; and
a map compilation device configured to correct and approve map information, wherein
the map generation device comprising:
a first processor to execute a first program; and
a first memory to store the first program which, when executed by the first processor, performs processes of:
generating position information of a planimetric feature based on measurement information around a road obtained by a measuring vehicle;
determining an evaluation value of each of a plurality of evaluation items that serve as indices for evaluating the reliability of the positional information of the planimetric feature based on the measurement information;
determining reliability of the position information of the planimetric feature based on evaluation values of the plurality of evaluation items; and
generating map information with reliability, the map information with reliability including reliability information indicating the reliability of the position information of the planimetric feature,
the map compilation device comprises:
a second processor to execute a second program; and
a second memory to store the second program which, when executed by the second processor, performs processes of correcting and approving the map information:
in the processes of correcting and approving the map information, the second processor of the map compilation device performs:
displaying a map corresponding to the map information with reliability, and
determining display colors of the planimetric feature in the displayed map based on the reliability of the planimetric feature, and
the plurality of evaluation items include:
an error amount when arrangement of composing points of the planimetric feature is approximated;
a parallelism between an arrangement direction of composing points of the planimetric feature and a movement trajectory of the measuring vehicle;
a distance between a position indicated by the position information of the planimetric feature and a position of the measuring vehicle when the position of the planimetric feature is measured;
an absolute value of reflection intensity of a position of the planimetric feature obtained from the measurement information or a difference of reflection intensity between a position of the planimetric feature and a surrounding thereof;

an altitude difference between a position of the planimetric feature the measurement information indicates and a surrounding thereof, or an inclination of an altitude change at a boundary between the planimetric feature and the surrounding thereof;

a direction of a surface obtained by surface approximation of composing points of the planimetric feature distributed in a plane; and a correspondence relationship between a height from a road surface at a position indicated by the position information of the planimetric feature and a size of a surface formed by composing points of the planimetric feature.

2. The map generation system according to claim 1, wherein
the first processor determines the reliability based on a weighted sum of the evaluation values of the plurality of evaluation items.

3. The map generation system according to claim 2, wherein
the second processor classifies the planimetric feature included in the map information with reliability depending on which evaluation value of the plurality of evaluation items being low among the plurality of evaluation items.

4. The map generation system according to claim 3, wherein
the first processor corrects the evaluation function for calculating the reliability so that the reliability of the position information of planimetric features having evaluation values similar to that of previously corrected planimetric features is lowered and the reliability of the position information of planimetric features having evaluation values similar to that of previously non-corrected planimetric features is raised.

5. The map generation system according to claim 2, wherein
the first processor corrects the evaluation function for calculating the reliability so that the reliability of the position information of planimetric features having evaluation values similar to that of previously corrected planimetric features is lowered and the reliability of the position information of planimetric features having evaluation values similar to that of previously non-corrected planimetric features is raised.

6. The map generation system according to claim 1, wherein
the second processor classifies the planimetric feature included in the map information with reliability depending on which evaluation value of the plurality of evaluation items being low among the plurality of evaluation items.

7. The map generation system according to claim 6, wherein
the first processor corrects the evaluation function for calculating the reliability so that the reliability of the position information of planimetric features having evaluation values similar to that of previously corrected planimetric features is lowered and the reliability of the position information of planimetric features having evaluation values similar to that of previously non-corrected planimetric features is raised.

8. The map generation system according to claim 1, wherein
the first processor corrects the evaluation function for calculating the reliability so that the reliability of the position information of planimetric features having evaluation values similar to that of previously corrected planimetric features is lowered and the reliability of the position information of planimetric features having evaluation values similar to that of previously non-corrected planimetric features is raised.

* * * * *